United States Patent
Lombardo et al.

(10) Patent No.: US 9,874,001 B2
(45) Date of Patent: Jan. 23, 2018

(54) WEDGE-BASED EARTH-WORKING TOOTH ADAPTER RETENTION ASSEMBLY

(71) Applicants: Pasquale Lombardo, Phoenix, AZ (US); Gaetano Lombardo, Phoenix, AZ (US)

(72) Inventors: Pasquale Lombardo, Phoenix, AZ (US); Gaetano Lombardo, Phoenix, AZ (US)

(*) Notice: Subject to any disclaimer, the term of this patent is extended or adjusted under 35 U.S.C. 154(b) by 0 days.

(21) Appl. No.: 15/380,808

(22) Filed: Dec. 15, 2016

(65) Prior Publication Data
US 2017/0167117 A1    Jun. 15, 2017

Related U.S. Application Data

(60) Provisional application No. 62/267,893, filed on Dec. 15, 2015.

(51) Int. Cl.
*E02F 9/28* (2006.01)
*F16B 15/00* (2006.01)

(52) U.S. Cl.
CPC .......... *E02F 9/2825* (2013.01); *E02F 9/2841* (2013.01); *F16B 15/00* (2013.01)

(58) Field of Classification Search
CPC ...... F16B 12/36; F16B 13/065; F16B 13/066; F16B 13/068; F16B 13/08; F16B 13/0891; F16B 13/124; F16B 37/085; F16B 37/0864; F16C 2226/16; F16C 2226/60; F16C 2226/62; E02F 9/2816; E02F 9/2825; E02F 9/2833; E02F 9/2841
See application file for complete search history.

(56) References Cited

U.S. PATENT DOCUMENTS

| | | | | |
|---|---|---|---|---|
| 5,410,826 A * | 5/1995 | Immel | ............. | E02F 9/2833 37/455 |
| 5,452,529 A * | 9/1995 | Neuenfeldt | ......... | E02F 9/2825 37/395 |
| 5,638,621 A * | 6/1997 | Keech | ............. | E02F 9/2833 37/446 |
| 6,301,810 B1 * | 10/2001 | Fidler | ............. | E02F 9/2833 37/455 |
| 8,458,931 B2 | 6/2013 | Knight | | |
| 2008/0276500 A1 * | 11/2008 | Ruvang | ............. | E02F 9/2833 37/452 |
| 2009/0199442 A1 * | 8/2009 | Woerman | ............. | E02F 9/2825 37/457 |
| 2011/0000109 A1 * | 1/2011 | Woerman | ............. | E02F 9/2825 37/455 |

(Continued)

*Primary Examiner* — Christopher M Koehler
(74) *Attorney, Agent, or Firm* — Thomas W. Galvani, P.C.; Thomas W. Galvani (57) ABSTRACT

A retention assembly for connecting two pieces of heavy equipment, such as a shovel and a tooth adapter, is described. A slot is formed when the tooth adapter is fit over the end of the shovel. The retention assembly includes an adapter configured to fit into the slot and against the shovel or the tooth adapter. A shim is also in the slot, separated from the adapter by a gap. A wedge nut is also applied to the slot, between the adapter and the shim. The wedge nut is applied to a rod. Movement of the wedge nut along the rod imparts a change in dimension of the gap to bind the retention assembly within the slot and thus secure the tooth adapter on the shovel.

19 Claims, 7 Drawing Sheets

(56) References Cited

U.S. PATENT DOCUMENTS

| | | | |
|---|---|---|---|
| 2011/0072693 A1* | 3/2011 | Knight | E02F 9/2833 37/456 |
| 2011/0258891 A1* | 10/2011 | Ruvang | E02F 9/2825 37/455 |
| 2013/0247429 A1* | 9/2013 | Campomanes | E02F 9/2825 37/456 |
| 2014/0082977 A1* | 3/2014 | Pilon | E02F 9/2833 37/453 |
| 2015/0082671 A1* | 3/2015 | Bierwith | B23P 19/04 37/455 |
| 2015/0096207 A1* | 4/2015 | Tasovski | E02F 9/2841 37/456 |
| 2015/0218782 A1* | 8/2015 | Quarfordt | E02F 9/2825 37/455 |
| 2016/0305098 A1* | 10/2016 | Kunz | E02F 9/2883 |
| 2017/0016212 A1* | 1/2017 | Triginer Boixeda | E02F 3/8152 |

* cited by examiner

WEDGE-BASED EARTH-WORKING TOOTH ADAPTER RETENTION ASSEMBLY

CROSS-REFERENCE TO RELATED APPLICATIONS

This application claims the benefit of U.S. Provisional Application No. 62/267,893, filed Dec. 15, 2015, which is hereby incorporated by reference.

FIELD OF THE INVENTION

The present invention relates generally to heavy machinery equipment, and more particularly to tooth adapters and the fasteners for coupling tooth adapters to heavy machinery equipment shovels.

BACKGROUND OF THE INVENTION

Heavy machinery equipment is used in mining, excavation, demolition, construction, and similar activities. The parts of heavy machines which are used for digging are exposed to a great amount of wear in operation. For instance, a ground engaging tool has teeth which continually dig, rip, cut, or lift dirt, rock, concrete, metal, or other heavy and rugged materials, which constantly wear against and abrade the surface of the teeth.

Heavy machinery parts are expensive and time-consuming to repair or replace, so many pieces of equipment are applied with wear plates or wear structures which can be replaced more quickly. For instance, on a ripper, the tooth may be a durable cover fitted onto the end of the ripper shank, so that when the tooth wears out, the tooth is removed and replaced without the need to repair the entire ripper shank. By removing and replacing only those parts which directly engage with the ground, considerable time and expense can be saved.

However, there are many safety issues with current designs of replacement parts. Current designs generally require that a sledgehammer be used to install pins which secure the replacement parts on the ripper shank. The pins are hammered into the parts, and often a tool is placed against the pin and hammered with the sledgehammer. This can lead to serious injury when the tool moves, is broken, or the sledgehammer misses its mark. The safety organizations which regulate workplace safety, such as MSHA and OSHA, disapprove of pins and replacement parts which require sledgehammers for installation. Further, a sledgehammer is also frequently used to remove the pin, by hammering the pin out of the replacement part. Again, this often leads to serious injury.

Many manufacturers of such replacement parts also incorporate unique or proprietary features in the parts that make removal and replacement difficult and expensive. Some manufacturers build replacement parts with special slots that will only accommodate their own tools. Others build parts that will only accept their own replacement parts. For instance, on a shovel, a tooth adapter fit on the shovel may be specially formed to only accept a tooth from the same manufacturer that made the adapter. Similarly, the tooth may have a slot or other engagement feature that requires that a proprietary pin be used to couple the tooth to the end of the adapter, because a slot formed between the adapter and the tooth will only accept those pins. Still further, some manufacturers may create coupling pins that require uniquely-shaped keys or tools to install or remove the pins. These fasteners can be difficult or dangerous to remove, risking bodily harm or even death, and generally incurring enormous opportunity costs while the shovel is prevented from operating. An improved fastening device for coupling heavy equipment parts is needed, as is an improved tooth and adapter assembly for heavy equipment.

SUMMARY OF THE INVENTION

A retention assembly for connecting two pieces of heavy equipment, such as a shovel and a tooth adapter, is described. A slot is formed when the tooth adapter is fit over the end of the shovel. The retention assembly includes an adapter configured to fit into the slot and against the tooth adapter. A shim is also in the slot, separated from the adapter by a gap. A wedge nut is also applied to the slot, between the adapter and the shim. The wedge nut is carried on a rod. Movement of the wedge nut along the rod imparts a change in dimension of the gap, generally causing the gap to expand and contract, depending on the direction of the movement of the wedge nut. Expansion of the gap binds the retention assembly within the slot and thus secures the tooth adapter on the shovel.

The above provides the reader with a very brief summary of the detailed description presented below, and is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings.

DETAILED DESCRIPTION

Figure 1:
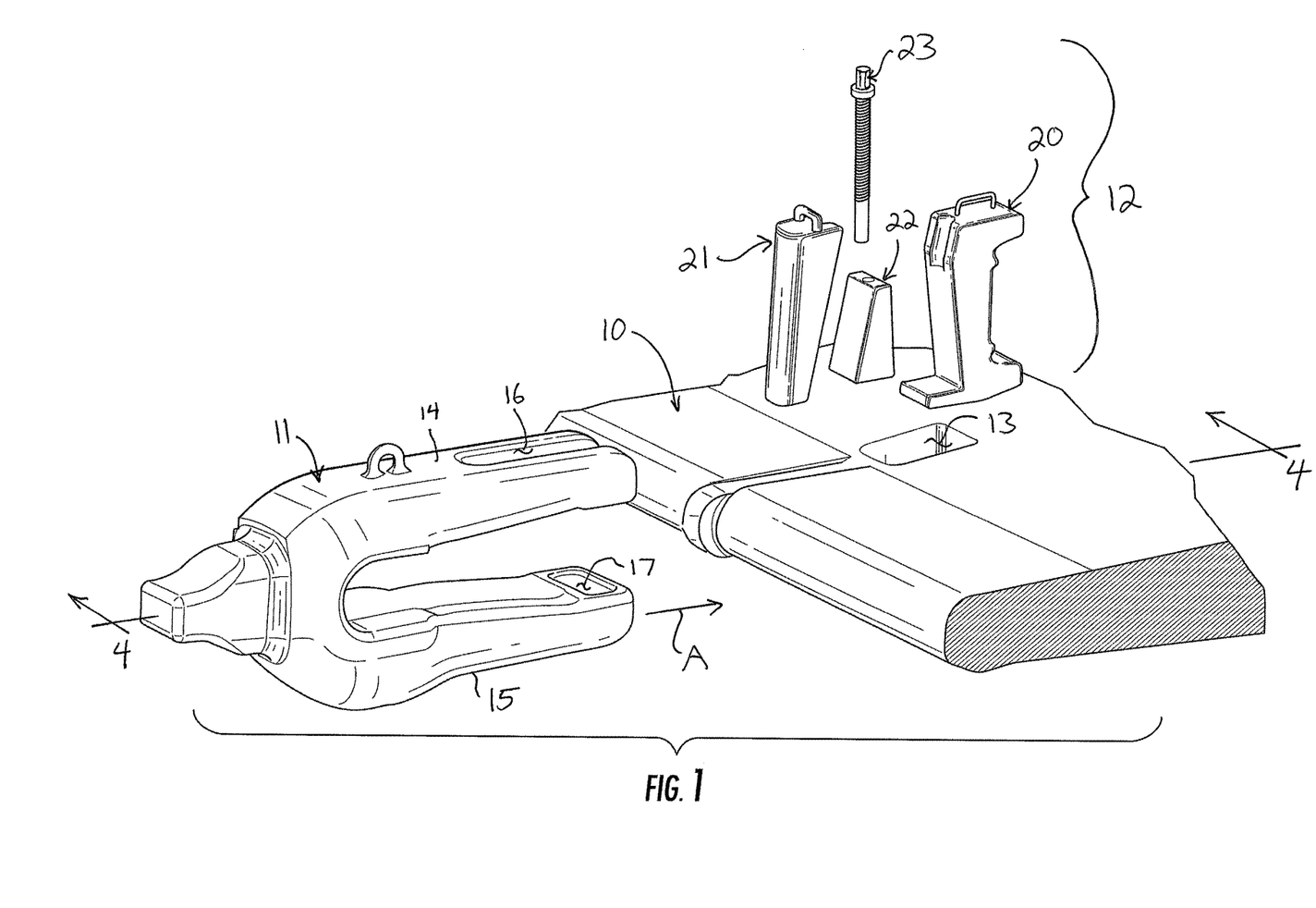
FIG. 1 is a perspective view of an end of a shovel with a tooth adapter disposed in front and a wedge-based earth-working tooth adapter retention assembly shown in exploded layout above.

Reference now is made to the drawings, in which the same reference characters are used throughout the different figures to designate the same elements. FIG. 1 illustrates a shovel 10 of an earth-working machine being fit with a tooth adapter 11 configured to carry a ripping tooth conventional to the heavy equipment machinery industry. A wedge-based earth-working tooth adapter retention assembly 12 (hereinafter, "retention assembly 12") is disposed above the shovel 10 in an exploded arrangement for clarity of each of the constituent parts of the retention assembly 12. An elongate slot 13 is formed entirely through the shovel 10 proximate to the lip of the shovel 10, ready to receive the tooth adapter 11 thereover and the retention assembly 12 therein. The tooth adapter 11 includes an upper jaw 14 and a lower jaw 15, each of which is formed with openings 16 and 17, respectively. When the tooth adapter 11 is properly applied to and registered on the shovel 10, the openings 16 and 17 are aligned with the slot 13, and the retention assembly 12 can be placed therein to bind the tooth adapter 11 to the shovel 10.

Figure 2:
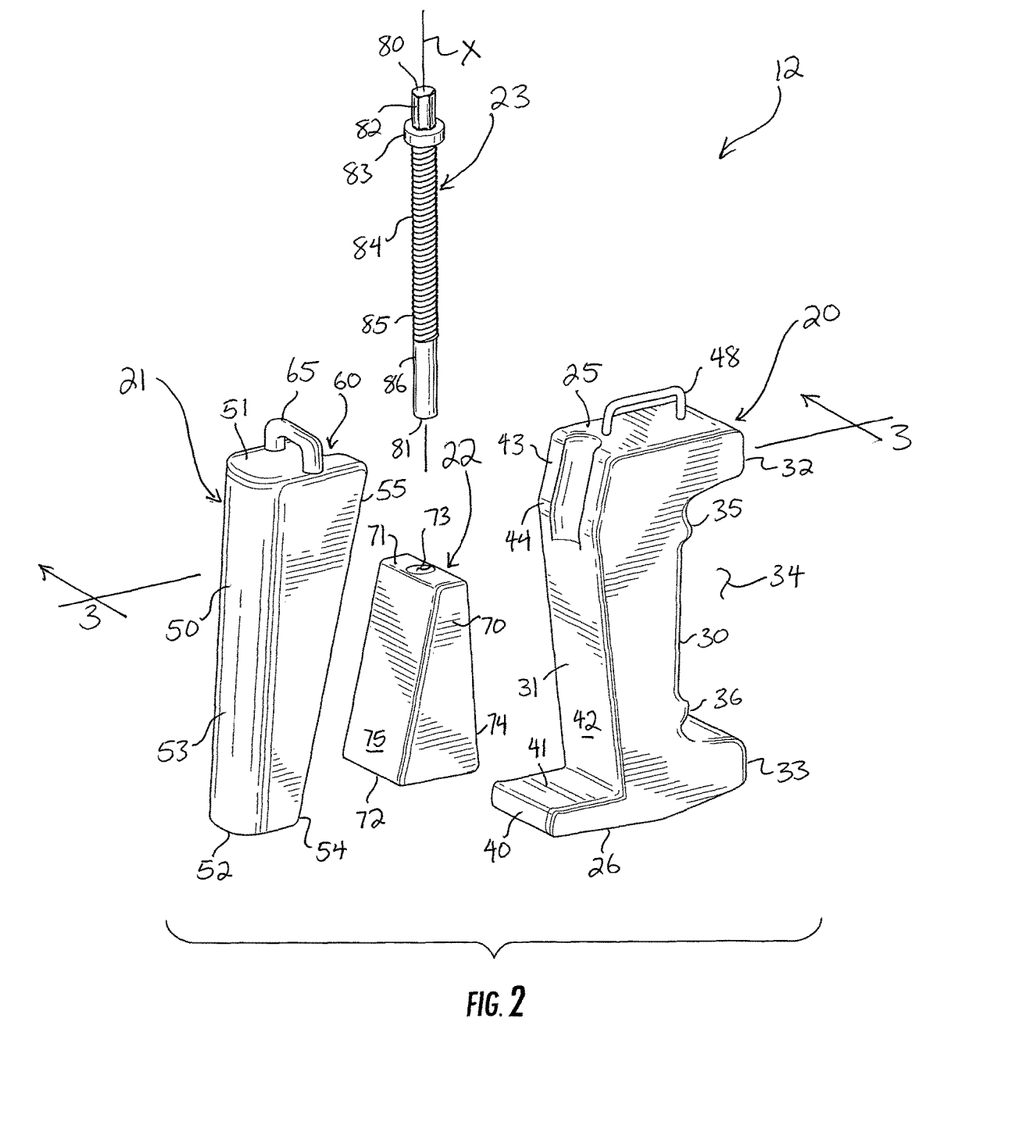
FIG. 2 is an exploded view of the retention assembly of FIG. 1 showing an adapter, a shim, a wedge, and a rod thereof.
Figure 3:
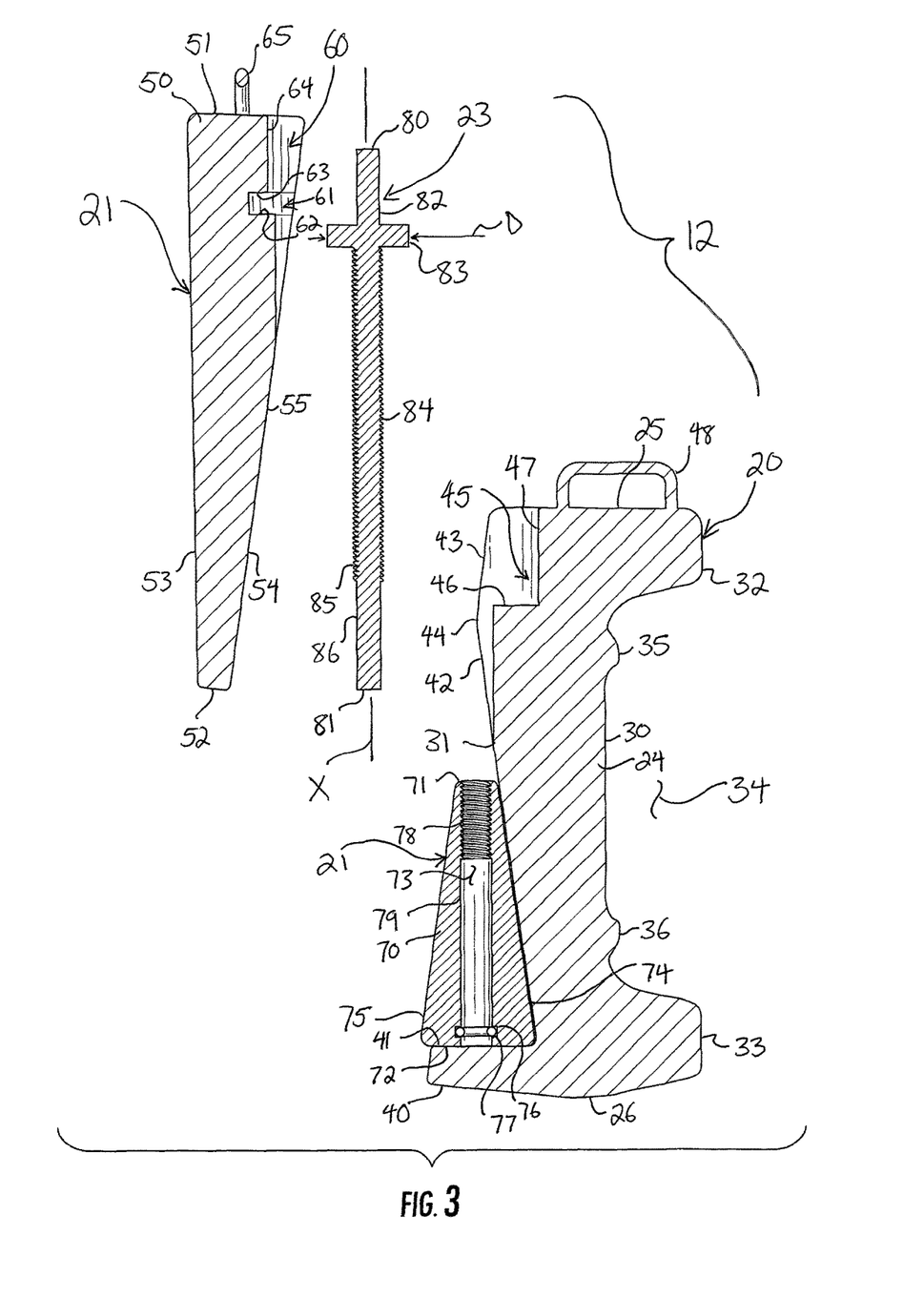
FIG. 3 is a section view taken along line 3-3 in FIG. 2 showing the wedge applied to the adapter.

FIG. 2 illustrates the retention assembly 12 in exploded detail, and FIG. 3 shows the retention assembly 12 applied into the slot 13 in section view taken along the line 3-3 in FIG. 2. The retention assembly includes a C-shaped adapter 20, a wedge piece or shim 21, a wedge nut 22, and a rod 23. The adapter 20 and the shim 21 fit into the slot 13 with the wedge nut 22 disposed therebetween on the rod 23. In operation, the rod 23 is rotated to assist in applying the shim 21 and expanding the retention assembly 12 so as to bind the tooth adapter 11 to the shovel 10.

The adapter 20 includes a body 24 having a top 25, a bottom 26, an outer side 30 and an inner side 31 extending between the top 24 and bottom 25, and two protrusions 32 and 33 on the outer side 30 proximate to the top 25 and bottom 26, respectively. The protrusions 32 and 33 are large, blocky projections extending integrally and monolithically from the body 24, and defined between them is a receiving space 34. The receiving space 34 is a shallow vertical space around which the C-shaped adapter 20 is shaped. Extending slightly into the receiving space 34, just below and above the protrusions 32 and 33, respectively, are two set points 35 and 36, respectively. The set points 35 and 36 are ridges extending across the outer side 30. The set points 35 and 36 project a lesser distance away from the body 24 than do the protrusions 32 and 33.

Opposite the outer side 30, the inner side 31 is formed with a variety of features useful for capturing and interacting with the wedge nut 22. Proximate to the bottom 26, a foot 40 projects outwardly from the body 24, opposite the protrusion 33. The foot 40 is formed integrally and monolithically to the body 24, and has a flat upper surface 41. The flat upper surface 41 is generally continuous and featureless, providing a solid platform at which both the wedge nut 22 and rod 23 are and can be received. From the foot 40, the inner side 31 of the adapter 20 includes an obliquely oriented major surface 42. The major surface 42 extends upwardly, toward the top 25, and outwardly, such that it hangs over the foot 40. The major surface 42 and the upper surface 41 of the foot 40 define an acute angle. Below the top 25, the major surface 42 transitions to a minor surface 43 at an inflection point 44. The minor surface 43 is oriented obliquely back toward the body 24.

A shoulder 45 is in the body 24 proximate to the top 25. The shoulder 45 is formed as a vertical, semi-cylindrical recess into the inner side 31, which terminates blindly behind the minor face 43 at a horizontal endwall 46 and a transverse, arcuate sidewall 47. A portion of the shoulder 45 continues behind the major surface 42 but tapers out of the body 24 as the major surface 42 is oriented obliquely inward. The shoulder 45 terminates at the blind endwall 46 at its bottom, but at its top, the shoulder 45 is open proximate to the top 25. As such, the shoulder 45 is defined as an open shoulder: the diameter of the endwall 46 continues entirely upward from the endwall 46 to the top 25.

The adapter 20 is solid, rugged, durable, hard, strong, and dense, and is integrally and monolithically constructed from a material or combination of materials having these characteristics, such as iron, steel, or another metal. The adapter 20 is incredibly heavy, and as such, the adapter 20 further includes a handle 48 at the top 25 to assist in placing and removing the adapter 20.

Referring still to both FIG. 2 and FIG. 3, the shim 21 includes a body 50 having a top 51, a bottom 52, and an outer side 53 and an inner side 54 extending between the top 51 and bottom 52. The inner side 54 has an inner face 55. The inner face 55 is inclined obliquely outwardly away from the body 50, with respect to the outer side 53.

A shoulder 60 is in the body 50 proximate to the top 51. The shoulder 60 is formed as a narrow, vertical, semi-cylindrical recess into the inner face 55. The shoulder 60 includes an annular recess 61, the diameter of which is larger than the diameter of the narrow semi-cylindrical recess of the shoulder 60. The shoulder 60 is thus defined as a closed shoulder because the wide diameter of the annular recess 61 does not extend entirely upward to the top 51: the annular recess 61 is restricted both above and below by the narrower-diameter portions of the shoulder 60. The diameter of the annular recess 61 is equal to the diameter of the shoulder 45. The annular recess 61 includes a horizontal lower end wall 62 and a horizontal upper end wall 63, and the shoulder 60 has a transverse, arcuate sidewall 64.

The shim 21 is solid, rugged, durable, hard, strong, and dense, and is integrally and monolithically constructed from a material or combination of materials having these characteristics, such as iron, steel, or another metal. The shim 21 is heavy, and as such, the shim 21 further includes a handle 65 at the top 51 to assist in placing and removing the shim 21.

Continuing reference to FIG. 2 and FIG. 3, the wedge nut 22 is a wedge placed between the adapter 20 and the shim 21 both to control application and removal of the retention assembly 12 with respect to the slot 13 and to urge expansion and allow contraction of the retention assembly 12 within the slot 13. The wedge nut 22 includes a body 70 having a top 71, an opposed bottom 72, a bore 73 formed entirely through the body 70 from the top 71 to the bottom 72, and opposed front and rear faces 74 and 75. The wedge nut 22 is symmetric about the bore 73, and so the front and rear faces 74 and 75 are opposite and identical, and are identified here as "front" and "rear" for clarity only. The top 71 and bottom are generally parallel to each other. The top 71 is much narrower between the front and rear faces 74 and 75 than the bottom 72, because the front and rear faces 74 and 75 converge toward each other oppositely and identically in an oblique fashion about the bore 73.

The bore 73 extends entirely through the body 70 of the wedge nut 22 so that it can be fully applied to the rod 23. Proximate to the top 71, the bore 73 has a threaded portion 78. The threading terminates approximately one-third of the length of the bore 73 from the top 71, with the remainder of the bore 73 being an unthreaded portion 79. Proximate to the bottom 72, but just above the bottom 72, is an annular recess 76 formed into the body 70 from the bore 73. The recess 76 is a seat for an annular gasket 77. The gasket 77 has an inner diameter just less than the diameter of the bore 73, such that the gasket protrudes slightly into the space bound by the bore 73. The wedge nut 22 is solid, rugged, durable, hard, strong, and dense, and is integrally and monolithically constructed from a material or combination of materials having these characteristics, such as iron, steel, or another metal.

With reference still to FIG. 2 and FIG. 3, the rod 23 is an elongate member having a top 80 and an opposed bottom 81. An axis X extends through the rod from the top 80 to the bottom 81. Proximate to the top 80 is a head 82. The head 82 is hexagonal so that it can be gripped by a tool such as a wrench. Just below the head 82 is a cylindrical flange 83. The flange 83 extends radially outward to a diameter D. Below the flange 83 is a long shank 84 that terminates at the bottom 81. The shank 84 has a long threaded portion 85 below the flange 82 and a shorter unthreaded portion 86 between the threaded portion 85 and the bottom 81.

The adapter 20, shim 21, wedge nut 22, and rod 23 cooperate to retain the tooth adapter 11 on the shovel 10. Each part is structured to fit with and engage the others so as to provide the secure and strong, yet easily removable retention assembly 12. FIGS. 3-7 illustrate steps of applying the retention assembly 12 to the slot 13.

Figure 4:
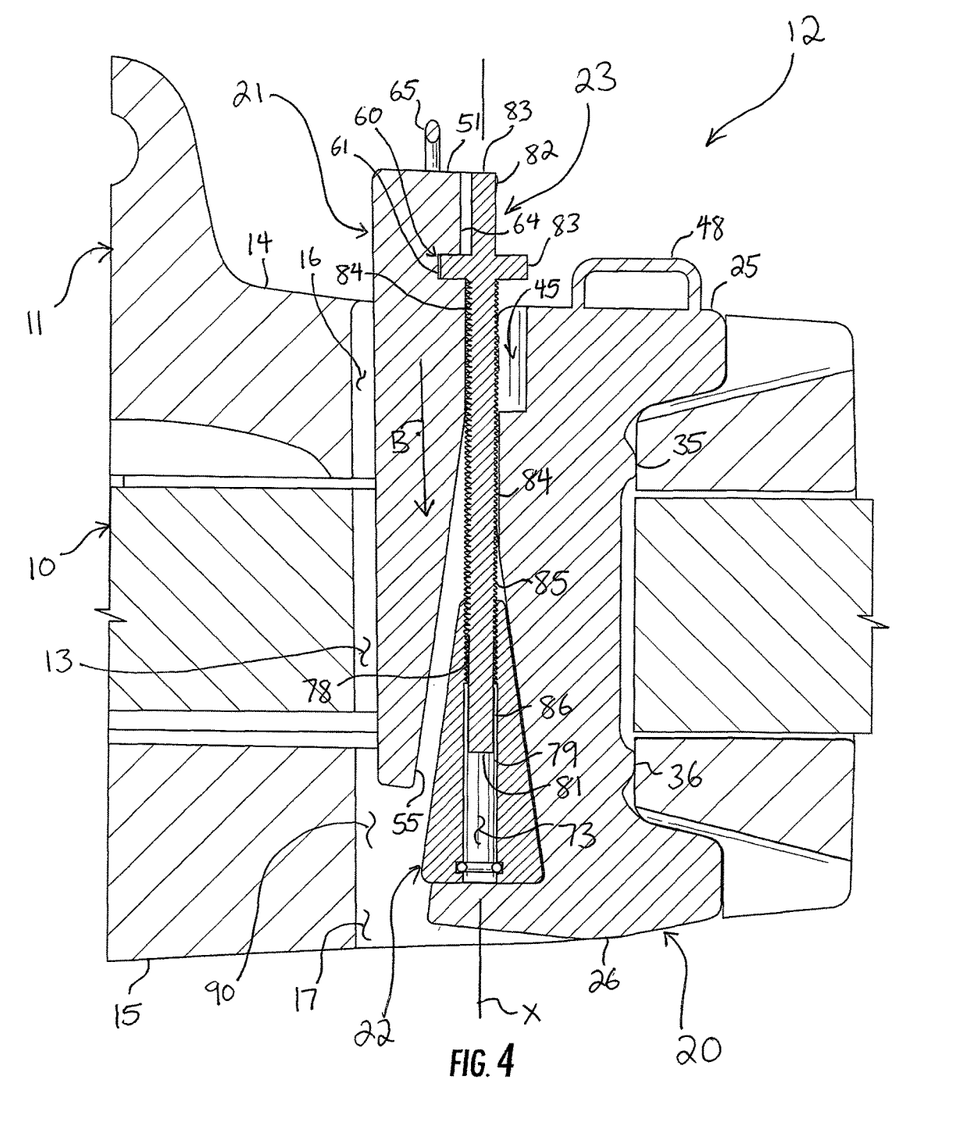
FIGS. 4-6 are section views taken along line 4-4 in FIG. 1 showing the retention assembly being applied to the shovel and the tooth adapter.

Referring briefly to FIG. 1, and then to FIGS. 3-7, the tooth adapter 11 is registered with the front of the shovel 10 and moved rearwardly over the shovel 10 with the upper and lower jaws 14 and 15 flanking the shovel 10, and the openings 16 and 17 registered with the slot 13. The tooth adapter 11 is applied to the shovel 10, and the slot 13, opening 16, and opening 17 cooperate to form an elongate slot 90, as shown in FIG. 4.

To prepare the retention assembly 12 for application to the slot 90, the wedge nut 22 is first nested against the adapter 20. To nest the wedge nut 22, the adapter 20 is held in an upright position with the top 25 directed up and the bottom 26 directed down. The wedge nut 22 is picked up, preferably with two hands, and held with the bottom 72 directed down and the front face 74 directed toward the major surface 42. The angle of the front face 74 corresponds to and is complemental to the angle of the major surface 42. The wedge nut 22 is thus placed against the inner side 31 of the adapter 20, with the bottom 72 of the wedge nut 22 in contact against the upper surface 41 of the foot 40. The entire upper surface 41 of the foot 40 is covered by the bottom 72 of the wedge nut 22, the opening of the bore 73 at the bottom 72 of the wedge nut 22 is entirely covered against the upper surface 41, and the wedge nut 22 projects beyond the foot 40 just slightly. The front face 74 of the wedge nut 22 is in contact against the major surface 42 of the adapter 20. When so seated, the top 71 of the wedge nut 22 is generally intermediate with respect to the top 25 and bottom 26 of the adapter 20, and the bore 73 is axially aligned with the sidewall 47 of the shoulder 45 behind the major surface 42.

The adapter 20 and wedge nut 22 are then handled together, preferably by several people or with the assistance of a lift, and moved into the slot 90, as shown in FIG. 4. The adapter 20 and wedge nut 22 are applied to the slot 90 with the bottom 26 of the adapter 20 first. The adapter has a width from the outer side 30 to the inner side 31, or from the protrusion 33 to the foot 40, that is just less than width of the slot 90, and with the wedge nut 22 seated into the adapter 20, there is just enough room to apply both into the slot 90 together; care must be taken. When fully vertically inserted into the slot 90, the bottom 26 of the adapter 20 is flush with the bottom of the lower jaw 15 and the top 25 of the adapter 20 is flush with the top of the upper jaw 14. The handle 48 projects out of the slot 90 above the upper jaw 14.

The adapter 20 is then pushed forwardly into contact with the shovel 10 and the upper and lower jaws 14 and 15 of the tooth adapter 11. The set points 35 and 36 flank the shovel 10 and are in contact with upper and lower jaws 14 and 15, as shown in FIG. 4. When so advanced, there is a gap behind the adapter 20 and wedge nut 22 in the slot 90. Into this gap, the shim 21 and rod 23 are together applied.

To apply the shim 21 and rod 23 together, the rod 23 is first applied to the shim 21. The shoulder 60 in the shim 21 is configured to receive the flange 83 therein; the annular recess 61 has the same diameter and height as the flange 83. The rod 23 is oriented vertically with its top 83 directed upward; likewise, the shim 21 is oriented vertically with its top 51 directed upward. When the tops 51 and 83 are registered with each other, the flange 83 is also registered with the annular recess 60 and the rod 23 can be applied to the shoulder 60. The rod 23 is applied to the shoulder 60, with the flange 83 being snugly received in the annular recess 61, the head 82 of the rod snugly received against the sidewall 64, and an upper portion of the shank 84 also received against the sidewall 64. When so received, the portion of the rod 23 proximate to the top 83 is in contact against the shim 21, and the portion of the rod 23 proximate to the bottom 81 is free of the shim 2, since the inner face 55 of the shim 21 angles away from the rod 23.

Still referring to FIG. 4, with the rod 23 applied to the shim 21, the rod 23 and shim 21 are applied to the gap behind the adapter 20 and the wedge nut 22. The rod 23 is registered with the bore 73, visible from above through the open shoulder 45, and the shim 21 is maintained behind the rod 23. The rod 23 and shim 21 are moved downward along arrowed line B in FIG. 4. The unthreaded portion 86 of the rod 23 is inserted into the bore 73 first, and slips in past the threaded portion 78. When the threaded potion 85 of the rod 23 enters the bore 73, it first encounters the threaded portion 78 of the bore 73. A hex wrench is applied to the head 82 of the rod 23 and rotated in a preferably clockwise direction, such that the shank 84 threadably engages the bore 73. The wedge nut 22 is prevented from rotation with the rod 23, as it is trapped between the major surface 42 of the adapter and the inner face 55 of the shim 21. Thus, as the rod 23 is rotated, the rod 23 is drawn downward along the axis X and along line B, and the shim 21, snugly fit to the flange 83 at the annular recess 61, is drawn downward along line B together with the rod 23. Rotational movement of the rod 23 thus imparts relative movement of the wedge nut 22 and the rod 23 along the axis X of the rod 23.

Figure 5:
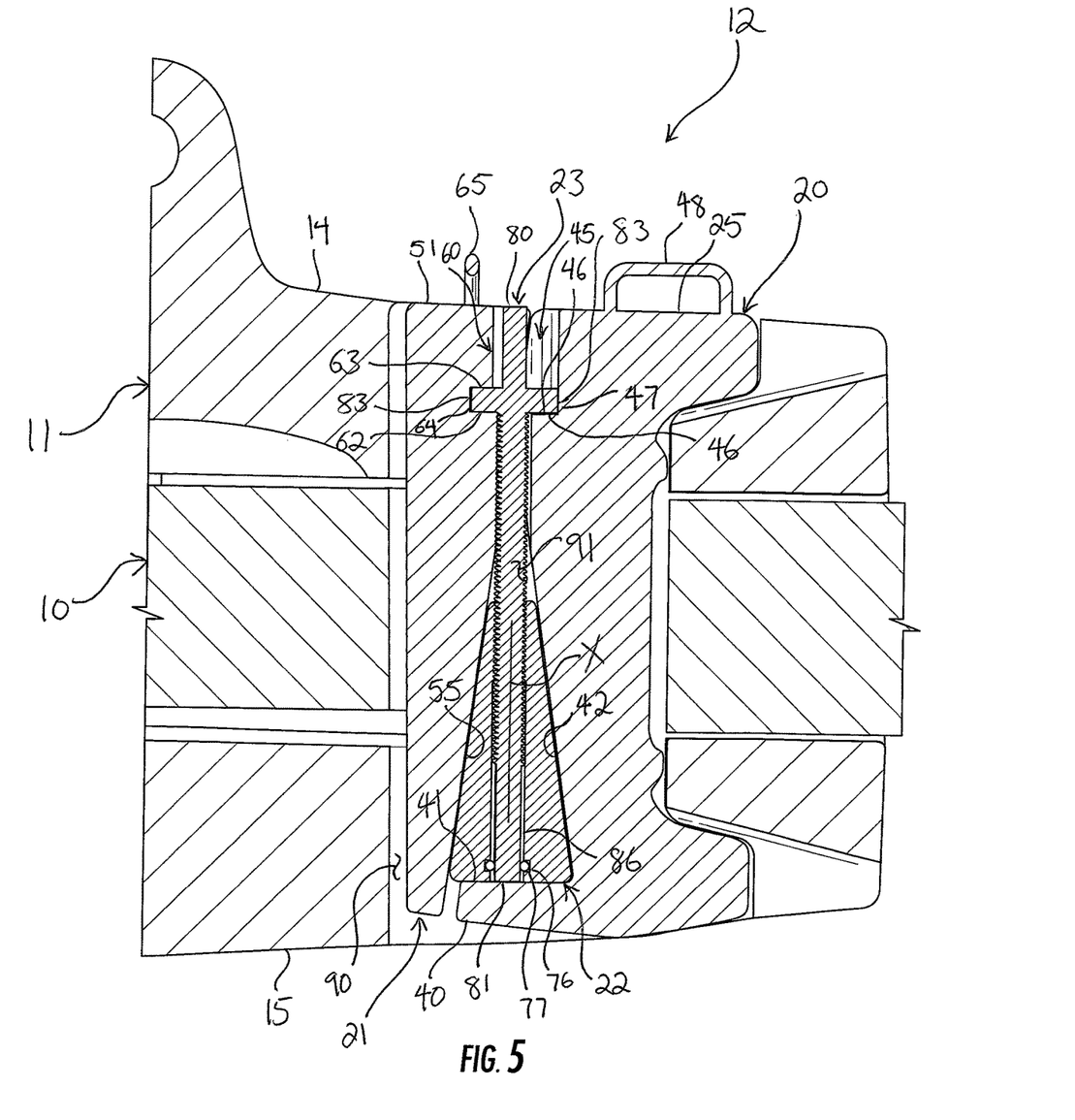
Figure 6:
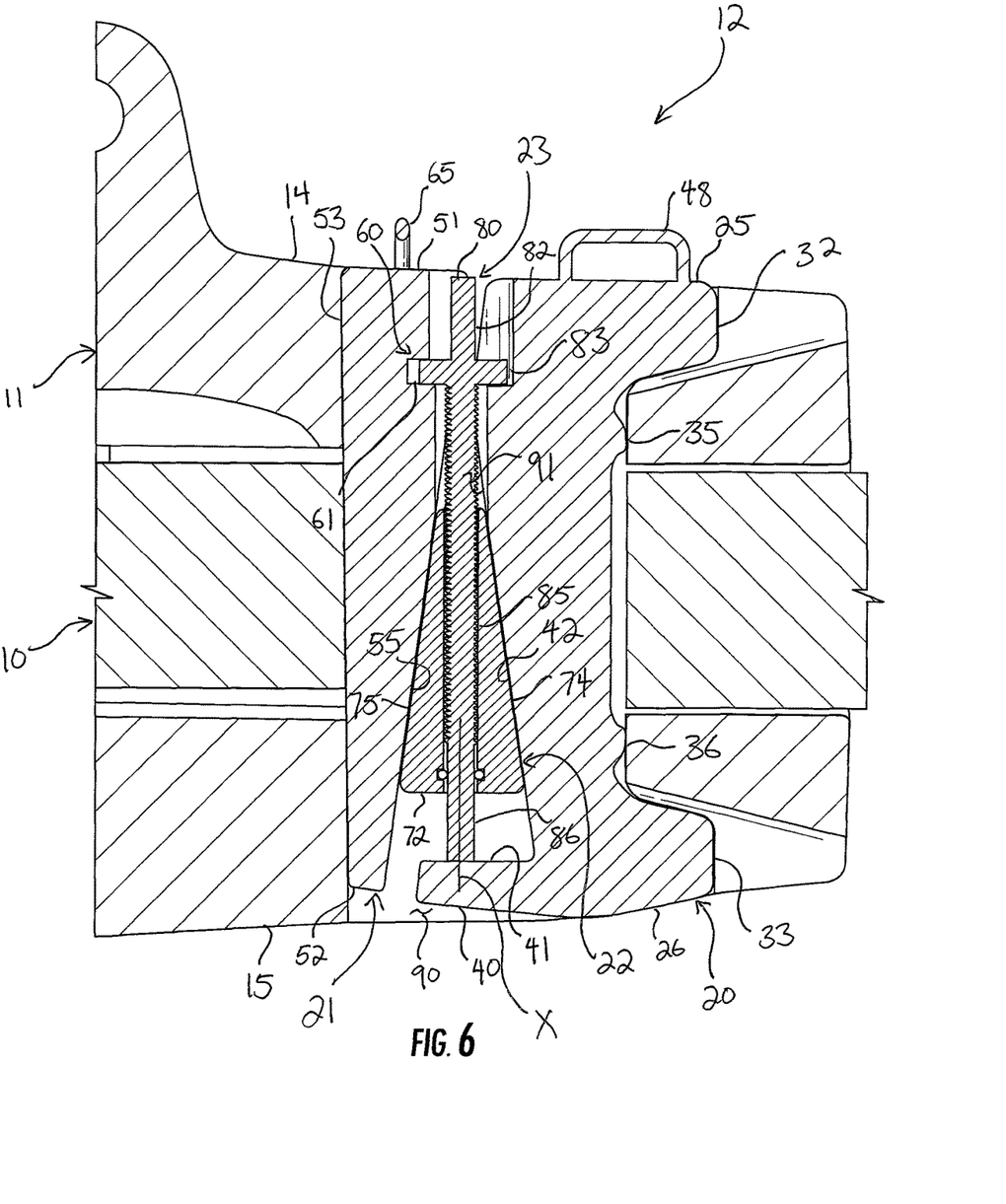
Figure 7:
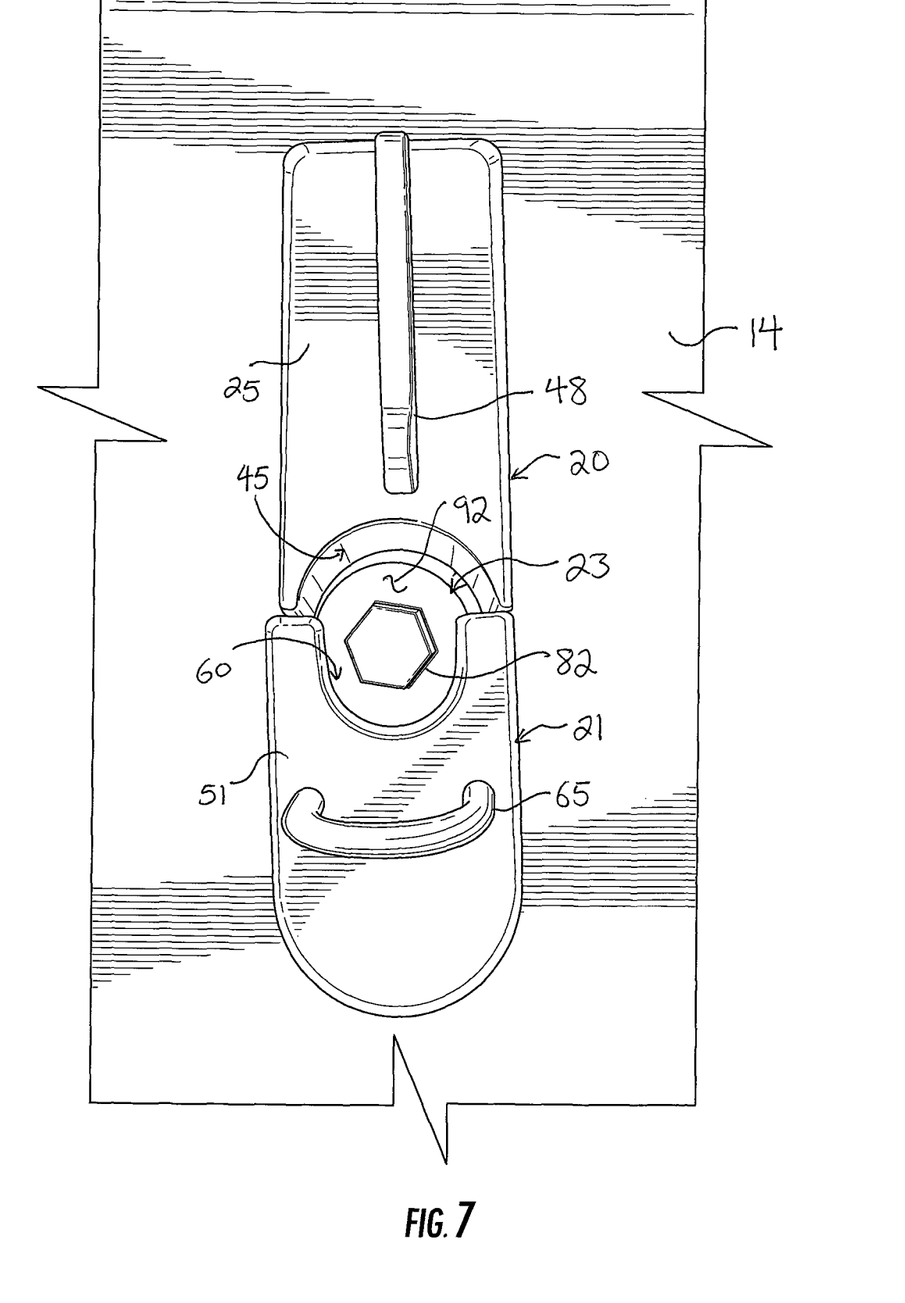
FIG. 7 is a top plan view of the retention assembly installed in the tooth adapter.

The rod 23 is rotated until the flange 83 encounters the endwall 46 of the shoulder 45 of the adapter 20, as shown in FIG. 5. This characterizes a seated position of the wedge nut 22 and the rod 23. In this seated position, the bottom 72 of the wedge nut 22 is flushly received in contact with the upper surface 41 of the foot 40 of the adapter 20. The rear face 75 of the wedge nut 22 protrudes just beyond the foot 40, such that the foot 40 is covered from above by the wedge nut 22. Further, in this seated position of the wedge nut 22 and the rod 23, the top 25 of the adapter 20, the top 51 of the shim 21, and the top 80 of the rod 23 are coplanar and flush with each other, and are coplanar and flush with the upper jaw 14 of the tooth adapter 11. Only the handles 48 and 65 project above. As seen in FIG. 7, which is a top view of the adapter 20, the shim 21, and the rod 23, when the shim 21 is being applied, the shoulders 45 and 60 form at the tops 25 and 51, respectively, an egg-shaped socket 92. The egg-shaped socket 92, unlike a circular socket, provides lateral play along a line between the adapter 20 and the shim 21. The egg-shaped socket 92 is bound by the shoulders 45 and 60 and allows the rod 23 to be wiggled and rocked laterally between the adapter 20 and the shim 21, to more easily install the rod 23. This allows the rod 23 to more easily find the bore 73 in the wedge nut 22, and allows the user to wiggle and position the wedge nut 22, carried at the bottom 81 of the rod 23. It also allows the user to wiggle and loosen the rod 23 when the retention assembly 12 is disassembled.

When the rod 23 is advanced through the bore 73, the bottom 81 of the rod 23 moves through the gasket 77 carried in the recess 76. The rod 23 forces the gasket 77 to expand, and the gasket 77 expands and moves over the bottom 81 and onto the unthreaded portion 86 of the rod 23, such that the gasket 77 becomes seated on the rod 23. The bottom 81 of the rod is received in direct contact with the upper surface 41 of the foot 40 of the adapter 20.

Still referring to the position of the retention assembly 12 shown in FIG. 5, the flange 83 of the rod 23 is fully received in both shoulders 45 and 60, in direct contact with the endwalls 46, 62, and 63, and closely received in a lateral direction by the sidewalls 47 and 64, respectively. The rod 23 is thus securely held in the seated position thereof and prevented from inadvertent lateral and vertical movement. However, the retention assembly 12 does still have some lateral play within the slot 90, and thus the tooth adapter 11 has some lateral play on the shovel 10, which is unacceptable.

To eliminate the lateral play and secure the tooth adapter 11 on the shovel 10, the retention assembly 12 is expanded. To expand the retention assembly 12, rotation of the rod 23 is continued while the rod 23 is in the seated position. The bottom 81 of the rod 23 is already against the upper surface 41 of the foot 40, which is continuous and solid. The wedge nut 22 is prevented from rotation with the rod 23, as it is trapped between the major surface 42 of the adapter and the inner face 55 of the shim 21. As such, continued rotation imparts relative vertical movement of the wedge nut 22 and the rod 23. Since the rod 23 cannot move further downward, the wedge nut 22 moves upward along the axis X of the rod 23. The front and rear faces 74 and 75 are in contact with the major surface 42 and the inner face 55 of the adapter 20 and shim 21, respectively. The front and rear faces 74 and 75 are oblique, and correspond to the angles of the major surface 42 and the inner face 55. The wedge nut 22 thus acts as a wedge between the adapter 20 and the shim 21: as the wedge nut 22 advances vertically, it imparts relative lateral movement of the adapter 20 and the shim 21 away from each other. The adapter 20 and the shim 21 are separated by a gap 91. This gap 91 widens in dimension in response to the relative lateral movement of the adapter 20 and the shim 21 away from each other. As the rod 23 continues to rotate, as the wedge nut 22 continues to rise, and as the gap 91 continues to widen, the outer side 53 of the shim 21 engages the rear of the slot 90, against the upper and lower jaws 14 and 15 and the shovel 10. This causes the adapter 20 to further press into the upper and lower jaws 14 and 15 at the set points 35 and 36, until the retention assembly 12 is fully expanded and bound in the slot 90, wherein the retention assembly 12 binds the tooth adapter 11 on the shovel 10.

Arranged in this way, the tooth adapter 11 cannot move from the shovel 10. Relative vertical movement of the tooth adapter 11 and the shovel 10 is prevented by the engagement of the protrusions 32 and 33 with the upper and lower jaws 14 and 15 respectively. Relative lateral movement of the tooth adapter 11 and the shovel 10 is prevented by the engagement of the set points 35 and 36 against the upper and lower jaws 14 and 15, respectively, at the front of the slot 90, and of the outer side 53 of the shim 21 against the upper and lower jaws 14 and 15 and the shovel 10 at the back of the slot 90.

As the shovel 10 is used to dig, rip, cut, and lift dirt, rock, concrete, metal, and other heavy and rugged materials, the shovel 10, the tooth adapter 11, and the teeth are worn down. Wear occurs across all exposed surfaces, and dirt, rock, and debris is packed into the cracks, seams, and joints in and between parts. Wear occurs on the tooth adapter 11 at the top and bottom of the tooth adapter 11. The handles 65 and 48, which project upwardly above the outer surfaces of the tooth adapter 11, are eventually worn off as the shovel 10 is used. The outer surfaces of the tooth adapter 11 are worn down and eliminated as well. When the outer surfaces of the tooth adapter 11 are worn down, the tops 51 and 25 and the bottoms 52 and 26 of the shim 21 and the adapter 20 are worn down as well. Even the top 80 of the rod 23 is worn down. The shovel 10 is continued to be used until the wear becomes too great and the tooth needs to be replaced. At the point at which the tooth needs to be replaced, wear on the tooth adapter 11 and the retention assembly 12 is substantial. However, it is not so substantial that the head 82 of the rod 23 is completely worn off. The hexagonal head 82 is still available to be gripped with a wrench.

To replace the tooth, the tooth adapter 11 must be removed from the shovel 10. The retention assembly 12 must thus be removed as well. To remove the retention assembly 12, a wrench is placed over the head 82 and rotated in a preferably counter-clockwise direction. From the seated position in FIG. 6, rotation of the rod 23 imparts relative vertical movement of the wedge nut 22 and the rod 23. However, the rod 23 does not move upward, because it is received in the annular recess 61 of the shoulder 60. Thus, rotation of the rod 23 causes the wedge nut 22 to descend along the axis X of the rod 23. Descent of the wedge nut 22 causes the gap 91 to reduce in dimension. The wedge nut 22 descends until the bottom 72 of the wedge nut 22 comes into contact with the upper surface 41 of the foot 40, as in FIG. 5. At this point, the wedge nut 22 can no longer move further downward. However, the rotation of the rod 23 is continued. Continued rotation of the rod 23 continues to impart relative vertical movement of the wedge nut 22 and the rod 23, with the wedge nut 22 remaining pressed against the upper surface 41 of the foot 40. The rod 23 thus begins to rise upwardly out of the wedge nut 22. Since the flange 83 is received in the annular recess 61 and the shoulder 60 is thus open, the rising rod 23 carries the shim 21 vertically upward as well, out of the slot 90, as shown in FIG. 4. When the threaded portion 85 of the shank 84 of the rod 23 rises above the internal threading of the bore 73 of the wedge nut 22, the unthreaded potion 85 of the shank 84 alone remains in the bore 73. As such, the shim 21 and the rod 23 can together be removed from the slot 90. Two people may be needed to remove the shim 21 and rod 23, as each is quite heavy and covered in dirt and dust, and the handle 65 likely has been worn off. Additionally, it is sometimes helpful to wiggle and rock the rod 23 from the head 82 in the egg-shaped socket 92 (FIG. 7) as such motion serves to break up dirt clumps or dirt bridges within the retention assembly 12 that may be limiting movement or removal of the parts.

Once the shim 21 and rod 23 are removed from the slot 90, the adapter 20 and wedge nut 22 can be removed. In some cases, if the adapter 20 is packed into the slot with dirt and debris, a few taps with a sledgehammer may be necessary to loosen the adapter 20. The adapter 20 can then be withdrawn from the slot 90, after or with the wedge nut 22. The tooth adapter 11 can then be removed and replaced with a new tooth adapter 11 for carrying a new tooth.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:
1. A retention assembly for securing a tooth adapter on a shovel, the tooth adapter and shovel forming a slot when fit together, the retention assembly comprising:

an adapter fit into the slot and against the tooth adapter, the adapter comprising a body having a top and an opposed bottom, an inner surface having a major surface and a minor surface oriented at an angle to the major surface, opposed first and second sides, and, on the first side, a top protrusion and a bottom protrusion, and on the second side, a foot at the bottom of the adapter, the foot projecting outwardly from the body opposite the bottom protrusion;

a shim separated from the adapter by a gap, the shim having an inner surface directed into the gap;

the major and minor surfaces of the adapter are each directed into the gap;

a rod having a top, a bottom, and an axis extending therebetween; and a wedge nut applied to the rod, the wedge nut disposed in the gap between the adapter and the shim;

wherein the foot is continuous and has a continuous upper surface against which the bottom of the rod is received in direct contact, and the major surface of the adapter and the inner surface of the shim converge toward each other and the axis of the rod.

2. The retention assembly of claim 1, further comprising:
a shoulder formed into the minor surface of the adapter;
a shoulder formed into the inner surface of the shim;
a flange on the rod proximate to the top of the rod; and
the shoulders are each configured to receive the flange.

3. The retention assembly of claim 2, wherein:
the shoulder on the adapter is open; and
the shoulder on the shim is closed.

4. The retention assembly of claim 2, wherein the shoulders of the adapter and the shim cooperate to form an egg-shaped socket in which the top of the rod is received.

5. The retention assembly of claim 1, wherein:
rotational movement of the rod imparts movement of the wedge nut, with respect to the rod, along the axis of the rod; and
movement of the wedge nut along the axis of the rod imparts a change in dimension of the gap.

6. The retention assembly of claim 1, wherein the wedge nut holds a gasket through which the rod moves and within which the rod becomes seated.

7. The retention assembly of claim 1, wherein:
the rod is threaded proximate to the top and unthreaded proximate to the bottom; and
the wedge nut has a bore to receive the rod, which bore is threaded along an upper portion and unthreaded along a lower portion.

8. A retention assembly for securing a tooth adapter on a shovel, the tooth adapter and shovel forming a slot when fit together, the retention assembly comprising:
an adapter fit into the slot and against the tooth adapter, the adapter comprising a body having a top and an opposed bottom, opposed first and second sides, and, on the first side, a top protrusion and a bottom protrusion, and on the second side, a foot at the bottom of the adapter, the foot projecting outwardly from the body opposite the bottom protrusion presenting a continuous upper surface;
a shim separated from the adapter by a gap;
a rod having a top, a bottom, and an axis extending therebetween; and
a wedge nut applied to a rod, the wedge nut disposed in the gap between the adapter and the shim;
rotation of the rod in a first direction with respect to the wedge nut imparts downward movement of the rod through the wedge nut into a seated position of the rod;
in the seated position of the rod, the bottom of the rod is seated in contact against the upper surface of the foot; and
in the seated position of the rod, continued rotation of the rod in the first direction with respect to the wedge nut imparts upward movement of the wedge nut along the rod into confrontation with the adapter and the shim, imparting expansion of the gap.

9. The retention assembly of claim 8, wherein in the seated position of the rod, rotation of the rod in a second direction opposite the first direction imparts upward movement of the rod out of the wedge nut and imparts upward movement of the shim with the rod.

10. The retention assembly of claim 8, further comprising:
an inner surface of the adapter having a major surface and a minor surface;
an inner surface of the shim; and
the major surface of the adapter and the inner surface of the shim converge toward each other and the axis.

11. The retention assembly of claim 10, further comprising:
a shoulder formed into the minor surface of the adapter;
a shoulder formed into the inner surface of the shim;
a flange on the rod proximate to the top of the rod; and
the shoulders are each configured to receive the flange.

12. The retention assembly of claim 11, wherein the shoulders of the adapter and the shim form an egg-shaped socket in which the top of the rod is disposed.

13. The retention assembly of claim 11, wherein:
the shoulder on the adapter is open; and
the shoulder on the shim is closed.

14. The retention assembly of claim 8, wherein:
rotational movement of the rod imparts movement of the wedge nut, with respect to the rod, along the axis of the rod; and
movement of the wedge nut along the axis of the rod imparts a change in dimension of the gap.

15. The retention assembly of claim 8, wherein the wedge nut holds a gasket through which the rod moves and within which the rod becomes seated.

16. The retention assembly of claim 8, wherein:
the rod is threaded proximate to the top and unthreaded proximate to the bottom; and
the wedge nut has a bore to receive the rod, which bore is threaded along an upper portion and unthreaded along a lower portion.

17. A method of securing a tooth adapter on a shovel, the method comprising:
providing a retention assembly including an adapter, a shim, a wedge nut, and a rod;
aligning the tooth adapter on the shovel to define a slot extending through the tooth adapter and the shovel;
applying the retention assembly to the slot, comprising the steps of:
applying the wedge nut to the tooth adapter;
applying the adapter against the tooth adapter in the slot, with the wedge nut carried on the tooth adapter;
applying the shim to the rod;
applying the rod to the wedge nut, and rotating the rod in a first direction with respect to the wedge nut, thereby moving the rod and the shim together downwardly into the slot until the rod encounters in direct contact a foot projecting outwardly from the body at a bottom of the adapter; and
continuing to rotate the rod in the first direction after the rod encounters the foot at the bottom of the adapter, wherein continuing to rotate the rod imparts vertical movement of the wedge nut upwardly on the rod, thereby imparting lateral movement of the adapter and the shim apart from each other.

18. The method of claim 17, further comprising:

providing a foot on the adapter, the foot having a solid, continuous upper surface; and the step of applying the rod to the wedge nut further includes rotating the rod until the rod is received against the upper surface of the foot of the adapter.

19. The method of claim 17, further comprising:

forming an open shoulder into the adapter having an endwall;

forming a closed shoulder into the shim; and providing a flange on the rod;

wherein the step of applying the shim to the rod further includes receiving the flange of the rod in the closed shoulder of the shim; and the step of applying the rod to the wedge nut further includes moving the rod downwardly so that the flange of the rod moves into and through the open shoulder until the flange encounters the endwall of the shoulder.

\* \* \* \* \*